United States Patent
Venkatasubbaiah et al.

(10) Patent No.: US 11,528,213 B2
(45) Date of Patent: Dec. 13, 2022

(54) SHARING ROUTES USING AN IN-MEMORY DATA STORE IN A DISTRIBUTED NETWORK SYSTEM

(71) Applicant: Juniper Networks, Inc., Sunnyvale, CA (US)

(72) Inventors: Ganesha Hebbale Venkatasubbaiah, Bangalore (IN); Nikhil Kumar Bansal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/247,933

(22) Filed: Dec. 30, 2020

(65) Prior Publication Data

US 2022/0210047 A1    Jun. 30, 2022

(51) Int. Cl.
*H04L 45/02*    (2022.01)
*H04L 45/16*    (2022.01)
*H04L 45/586*   (2022.01)
*H04L 45/64*    (2022.01)

(52) U.S. Cl.
CPC ............ *H04L 45/02* (2013.01); *H04L 45/16* (2013.01); *H04L 45/586* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 10,200,274 B1 * | 2/2019 | Suryanarayana | H04L 49/70 |
| 10,756,956 B2 * | 8/2020 | Gammel | H04L 41/0681 |
| 11,411,872 B2 * | 8/2022 | Rahouti | H04L 47/12 |
| 2021/0112008 A1 * | 4/2021 | Rahouti | H04L 47/12 |

FOREIGN PATENT DOCUMENTS

| | | |
|---|---|---|
| CN | 107888499 A | 4/2018 |
| WO | 2013/184846 A1 | 12/2013 |

OTHER PUBLICATIONS

Extended Search Report from counterpart European Application No. 21164174.1 dated Oct. 11, 2021, 11 pp.
Li et al., "Enabling Multi-Tenants Isolation for Software-Defined Cloud Networks via XMPP and BGP: Implementation and Evaluation," IEEE, 2019 7th International Conference on Future Internet of Things and Cloud (FiCloud), Aug. 26-28, 2019, pp. 72-79.

(Continued)

*Primary Examiner* — Xavier S Wong
(74) *Attorney, Agent, or Firm* — Shumaker & Sieffert, P.A.

(57) ABSTRACT

This disclosure describes techniques for sharing routes between nodes in a distributed network system. An example method includes receiving, by a control node of a software-defined network (SDN) controller, a route from a compute node of a plurality of compute nodes in a network; publishing, by the control node and in response to receiving the route, a route update to an in-memory database service of the SDN controller; and sending, by the in-memory database service in response to receiving the published route update, the published route update to any of the plurality of compute nodes that have subscribed to receive route updates for an in-memory database instance associated with the control node.

20 Claims, 10 Drawing Sheets

(56) References Cited

OTHER PUBLICATIONS

Rosen et al., "BGP/MPLS IP Virtual Private Networks (VPNs)," RFC 4364, Network Working Group, Feb. 2006, 47 pp.
Mackie et al., "BGP-Signaled End-System IP/VPNs," draft-ietf-l3vpn-end-system-06, Network Working Group, Dec. 15, 2016, 32 pp.
Bates, et al., "Multiprotocol Extensions for BGP-4," Network Working Group, RFC 4760, Jan. 2007, 12 pp.
Saint-Andre, "Extensible Messaging and Presence Protocol (XMPP): Core," RFC 6120, Internet Engineering Task Force (IETF), Mar. 2011, 211 pp.
Hopps, "Analysis of an Equal-Cost Multi-Path Algorithm," RFC 2992, Network Working Group, Nov. 2000, 8 pp.

\* cited by examiner

SHARING ROUTES USING AN IN-MEMORY DATA STORE IN A DISTRIBUTED NETWORK SYSTEM

TECHNICAL FIELD

The disclosure relates to computer networks and, more particularly, to communicating routes within virtual networks.

BACKGROUND

In a typical cloud data center environment, there is a large collection of interconnected servers that provide computing functionality (e.g., compute nodes) and/or storage capacity (e.g., storage nodes) to run various applications. For example, a data center comprises a facility that hosts applications and services for customers of the data center. The data center, for example, hosts all the infrastructure equipment, such as networking and storage systems, redundant power supplies, and environmental controls. In a typical data center, clusters of servers are interconnected via a high-speed switch fabric provided by one or more tiers of physical network switches and routers. More sophisticated data centers provide infrastructure spread throughout the world with subscriber support equipment located in various physical hosting facilities.

Software-defined networking (SDN) platforms may be used in data centers and, in some cases, may use a logically centralized and physically distributed SDN controller and a distributed forwarding plane in virtual routers that extend the network from physical routers and switches in the data center into a virtual overlay network hosted in virtualized servers (referred to as compute nodes). The SDN controller provides management, control, and analytics functions of a virtualized network and orchestrates the virtual routers by communicating with the virtual routers.

SUMMARY

In general, this disclosure describes techniques for sharing routes between nodes in a distributed network system, such as in a software-defined networking system, for example. The disclosure describes techniques for using an in-memory data store to facilitate communicating routes between nodes in a distributed software-defined networking system. The techniques employ a publish-subscribe model, where the nodes publish route updates to the in-memory data store or subscribe to receive route updates from the in-memory data store. For example, a control node of an SDN controller publishes route updates to an in-memory data store of the SDN controller, and a compute node that is managed by the SDN controller subscribes to receive the route updates from the in-memory data store. Route updates may include routes that are being added (e.g., through new virtual machines being instantiated) or routes being deleted.

In some examples, compute nodes may execute virtual routers to implement a forwarding plane for one or more virtual networks having virtual network destinations hosted by the compute nodes. In some examples, the virtual network destinations are virtual workloads. The control nodes of SDN controllers and the virtual routers of the compute nodes communicate to share information to control forwarding of tenant traffic within the virtual networks to reach these virtual network destinations. Compute nodes and control nodes associated with different SDN controllers may be arranged in SDN clusters. Using an in-memory database service for distributing routes as described herein can help avoid a situation in which an SDN controller becomes overloaded, for example, with route updates when failover occurs from one SDN controller to another in an SDN cluster.

The techniques of this disclosure may provide one or more technical advantages. For example, the techniques of this disclosure may improve scalability and network performance within distributed network systems, such as SDN platforms. The techniques enable an SDN controller to outsource the function of distributing routes received from compute nodes, to an in-memory database service in a manner that enables many route updates to be processed without impacting network performance of the SDN controller. The control node is freed from the task of publishing specific routing instance routes to compute nodes. Instead, the control node only needs to publish all the routes to the in-memory database instance associated with the control node.

In addition, a node typically reserves one-fourth of the node's maximum memory value for an in-memory database service. With some servers having more than 128 GB Random Access Memories (RAMs), reserving 32 GB of memory for routes in the in-memory database is not likely to be a constraint even in scaled scenarios. In this manner, the decoupling of SDN controller and compute nodes into publishers and subscribers may allow greater scalability of compute nodes that are connected to a control node. The publish-subscribe ("pub-sub") model is also robust and therefore may work well in contexts where low latency and substantial throughput are critical.

In one example, a method includes receiving, by a control node of a software-defined network (SDN) controller, a route from a compute node of a plurality of compute nodes in a network; publishing, by the control node and in response to receiving the route, a route update to an in-memory database service of the SDN controller; and sending, by the in-memory database service in response to receiving the published route update, the published route to any of the plurality of compute nodes that have subscribed to receive route updates for an in-memory database instance associated with the control node.

In another example aspect, an SDN controller includes a memory; and processing circuitry configured to: receive a route from a compute node of a plurality of compute nodes in a network; in response to receiving the route, and by a control node of the SDN controller, publish a route update to an in-memory database service of the SDN controller; and send, by the in-memory database service in response to receiving the published route update, the published route update to any of the plurality of compute nodes that have subscribed to receive route updates for an in-memory database instance associated with the control node.

In a further example aspect, a non-transitory computer-readable storage medium comprising instructions for causing a programmable processor of a software-defined network (SDN) controller to: receive, by a control node of a SDN controller, a route from a compute node of a plurality of compute nodes in a network; in response to receiving the route, publish a route update to an in-memory database service of the SDN controller; and send, by the in-memory database service in response to receiving the published route update, the published route update to any of the plurality of compute nodes that have subscribed to receive route updates for an in-memory database instance associated with the control node.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
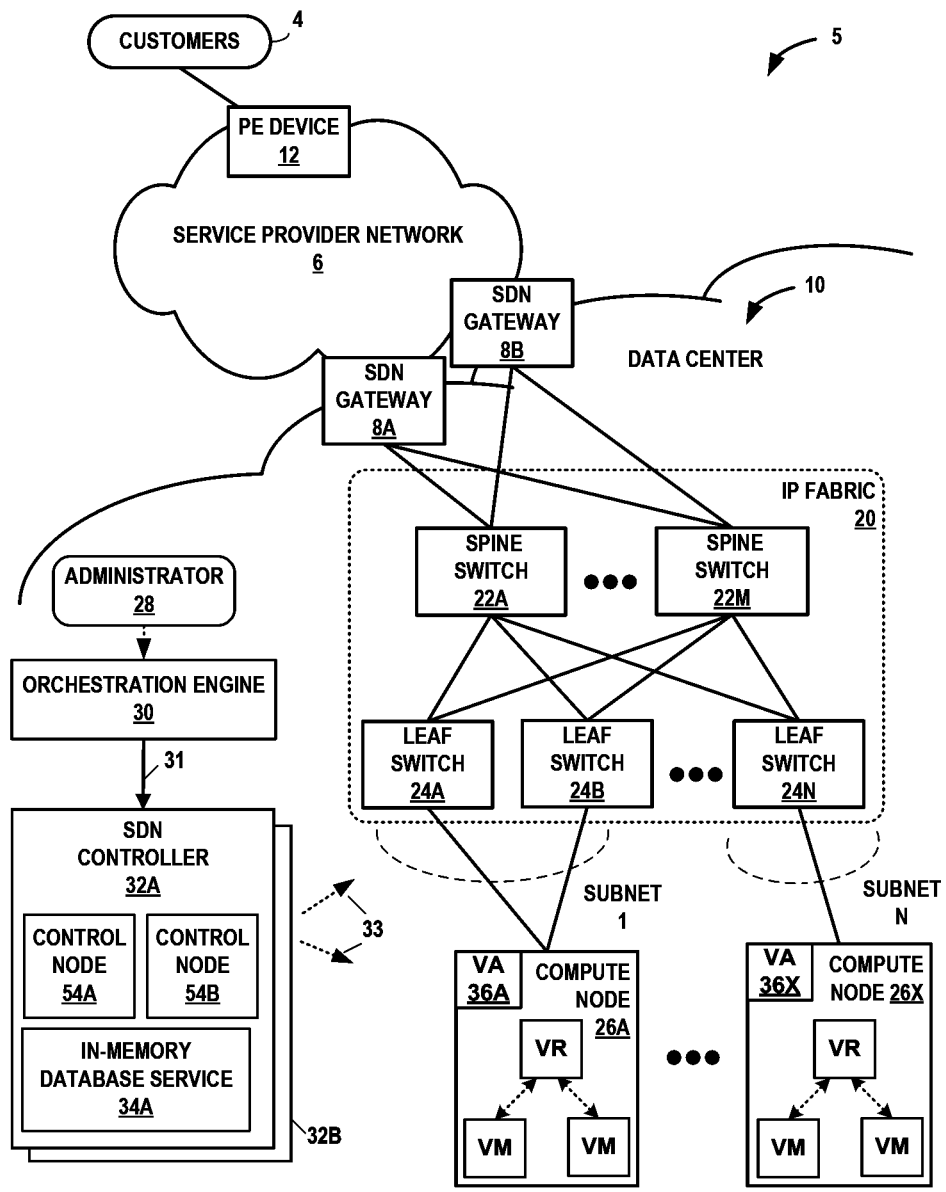
FIG. 1 is a block diagram illustrating an example network system having a data center in which examples of the techniques described herein may be implemented.

FIG. 1 is a block diagram illustrating an example network system 5 having a data center 10 in which examples of the techniques described herein may be implemented. In network system 5, SDN controllers 32A-32B ("SDN controllers 32") and compute nodes 26A-26X ("compute nodes 26") operate in accordance with the techniques described herein to reduce disruption due to overloading of a control node when another control node goes down, thereby ensuring customer traffic flow and customer applications executing within the cloud data center continue without interruption.

In general, data center 10 provides an operating environment for applications and services for customers 4 coupled to the data center 10 by service provider network 6. Customers 4 are coupled to service provider network 6 by provider edge (PE) device 12. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via an Internet Protocol (IP) fabric 20 provided by one or more tiers of physical network switches and routers. Compute nodes 26 are servers that function as compute nodes of the data center. In some examples, the terms "compute nodes" and "servers" are used interchangeably herein to refer to compute nodes 26. For example, each of compute nodes 26 may provide an operating environment for execution of one or more customer-specific virtual machines ("VMs" in FIG. 1). IP fabric 20 is provided by a set of interconnected leaf switches 24A-24N (collectively, "leaf switches 24") coupled to a distribution layer of spine switches 22A-22M (collectively, "spine switches 22"). Leaf switches 24 may also be referred to as top-of-rack (TOR) switches. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, leaf switches 24 and spine switches 22 provide compute nodes 26 with redundant (multi-homed) connectivity to IP fabric 20. Spine switches 22 aggregate traffic flows and provides high-speed connectivity between leaf switches 24. Leaf switches 24 are network devices that provide layer two (e.g., MAC) and/or layer 3 (e.g., IP) routing and/or switching functionality. Leaf switches 24 and spine switches 22 each include one or more processors and a memory, and that are capable of executing one or more software processes. SDN gateways 8A-8B ("SDN gateways 8"), also referred to as gateway routers, are routing devices that perform layer 3 routing to route network traffic between data center 10 and customers 4 by service provider network 6. SDN gateways 8 provide redundant gateways to forward and receive packets between IP fabric 20 and service provider network 6.

SDN controllers 32 provide logically, and in some cases physically, centralized controllers for facilitating operation of one or more virtual networks within data center 10 in accordance with one or more examples of this disclosure. The terms SDN controller and Virtual Network Controller ("VNC") may be used interchangeably throughout this disclosure. In some examples, SDN controllers 32 operate in response to configuration input received from orchestration engine 30 via northbound Application Programming Interface (API) 31, which in turn operates in response to configuration input received from administrator 28. Additional information regarding a SDN controller operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g., the Internet or a VPN. Orchestration engine 30 may implement a security policy across a group of VMs or to the boundary of a tenant's network. Orchestration engine 30 may deploy a network service (e.g., a load balancer) in a tenant's virtual network.

Typically, the traffic between any two network devices, such as between network devices within IP fabric 20 or between compute nodes 26 and customers 4 or between compute nodes 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multi-path routing strategy involving the assignment of flows to bins by hashing packet header fields that sends all packets from a particular network flow over a single deterministic path.

A "flow" can be defined, for example, by five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Each of compute nodes 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of compute node 26A, for instance, from the underlying physical network fabric may include an outer header to allow the physical network fabric to tunnel the payload or "inner packet" to a physical network address for a network interface of compute node 26 that executes the virtual router. The outer header may include not only the physical network address of the network interface of the server but also a virtual network identifier such as a Virtual Extensible LAN (VXLAN) tag or Multiprotocol Label Switching (MPLS) label that identifies one of the virtual networks as well as the corresponding routing instance executed by the virtual router or an interface. That is, the MPLS label can map either to a routing instance or to an interface. An inner packet includes an inner header having a destination network address that conform to the virtual network addressing space for the virtual network identified by the virtual network identifier. In some aspects, the virtual router buffers and aggregates multiple tunneled packets received from the underlying physical network fabric prior to delivery to the appropriate routing instance for the packets.

In some examples, SDN controller 32A manages the network and networking services such load balancing, security, and allocating resources from compute nodes 26 to various applications via southbound API 33. That is, southbound API 33 represents a set of communication protocols utilized by SDN controller 32A to make the actual state of the network equal to the desired state as specified by orchestration engine 30. One such communication protocol may include a messaging protocol such as Extensible Messaging and Presence Protocol (XMPP), for example. For example, SDN controller 32A implements high-level requests from orchestration engine 30 by configuring physical switches, e.g., leaf switches 24, spine switches 22; physical routers; physical service nodes such as firewalls and load balancers; and virtual services such as virtual firewalls in a VM. SDN controller 32A maintains routing, networking, and configuration information within a state database. SDN controller 32A communicates a suitable subset of the routing information and configuration information from the state database to virtual router (VR) agents 36A-36X ("VA" in FIG. 1) on each of compute nodes 26A-26X.

Compute nodes and control nodes associated with different SDN controllers may be arranged in SDN clusters. A cluster is a group of real and/or virtual servers that form an SDN controller, including control nodes, and compute nodes managed by the SDN controller. For example, as shown in FIG. 1, a system may include two SDN controllers 32A and 32B in a high-availability arrangement, each associated with the same cluster of servers. In some examples, SDN controller 32A is an active controller that manages a set of compute nodes, and SDN controller 32B operates as a backup controller for the same set of compute nodes if SDN controller 32A goes down.

In the example of FIG. 1, SDN controller 32A learns and distributes routing and other information (such as configuration information) to all compute nodes in the data center 10. The VR agent 36 running inside the compute node, upon receiving the routing information from SDN controller 32A, typically programs the data forwarding element (virtual router) with the forwarding information. SDN controller 32A sends configuration information to the VR agent 36 using a messaging protocol such as XMPP protocol. In typical operation, SDN controllers 32 and agents communicate routes and configuration over the same XMPP channel.

A given SDN cluster can have multiple compute nodes connected to a single control node. In such a scaled setup, the routing table of the control node can contain large number of routes, which would typically include XMPP routes sent from the compute nodes towards the control nodes, and BGP routes sent from other control nodes or gateway routers. FIG. 1 illustrates an SDN cluster with two control nodes, namely SDN controller 32A and SDN controller 32B and multiple compute nodes 26. In this example, all the compute nodes 26 have SDN controller 32A as the primary controller and SDN controller 32B as the secondary controller. Since this is a scaled setup, the routing table of SDN controller 32A and SDN controller 32B can have entries ranging from thousands to even millions of routes.

In this scenario, assume SDN controller 32A goes down or restarts. All the compute nodes 26 now mark SDN controller 32B as the primary controller. It is now the responsibility of SDN controller 32B to download all the routes in its routing table to the corresponding compute nodes 26. At the same time, SDN controller 32B also has to listen to XMPP updates from the compute nodes and modify its routing table accordingly. Even if the routing information does not change, there is a lot of XMPP message flow. All this churn may cause a spike in the load on SDN controller 32B, causing it to slow down while servicing requests. This spike can range from a few seconds to minutes based on the scale. The problem becomes acute at the time of an in-place upgrade of the cluster where all the controllers are upgraded serially.

To alleviate this problem, the techniques of this disclosure propose to modify how routes are downloaded from the control nodes to the compute nodes. This disclosure describes transferring routes from control nodes to compute nodes using an in-memory database service with publish-subscribe capability. The in-memory database service 34A could be an external service such as Redis, Memcached, or other in-memory database service. Each control node 54 may have a corresponding in-memory database service instance, and may publish all the routes to the in-memory database service instance. The in-memory database service may create a channel for each routing instance (RI) and interested compute nodes may subscribe to the RIs. The in-memory database service instance may in turn publish those routes to interested compute nodes which happen to be the subscribers in this pub-sub model. The messaging format between the in-memory database service and the compute nodes may follow the pub-sub messaging paradigm. For example, the in-memory database service and the compute nodes or control nodes may communicate using an application programming interface (API), such as the Java Message Service (JMS) API.

In case of route update/deletion, the control node 54 may update the in-memory database service instance, which in turn will publish the updated information to all the interested compute nodes 26. The XMPP configuration and keepalive channel between the control nodes 54 and the compute nodes 26 will remain intact.

For example, the control node 54 may detect that the compute node is no longer responsive; deleting, e.g., by a keepalive mechanism, and in response will delete stored routes learned from the compute node. The control node then publishes to the in-memory database service a route update reflecting deletion of the stored routes learned from the compute node.

In case a control node 54A goes down, the compute nodes 26 detect this using the XMPP channel. The compute nodes 26 may then disconnect from the in-memory database service instance corresponding to control node 54A, and subscribe to the in-memory database service instance of a new control node, such as control node 54B. If a compute node such as compute node 26B goes down, the control node 54A detects it using the XMPP channel. All the XMPP routes learned from that compute node 26B would be deleted and the same would be published to the in-memory database service instance.

The techniques of this disclosure may provide one or more technical advantages. For example, the techniques may provide more scalability. The ability to scale the network is constrained by an amount of memory of the physical server that is allocated for the in-memory database. The in-memory database service, which could be implemented in a container, is an efficient, optimized lightweight service that has a small footprint in the server. The operation of the in-memory database service does not significantly add to or burden the server. In addition, the techniques may enable use of a simpler and thus less expensive device for the control node without experiencing overload, because some of the route distribution function and state requirements are outsourced to the in-memory database service, which is typically optimized for the publish subscribe model and comes with its own high-availability library.

Figure 2:
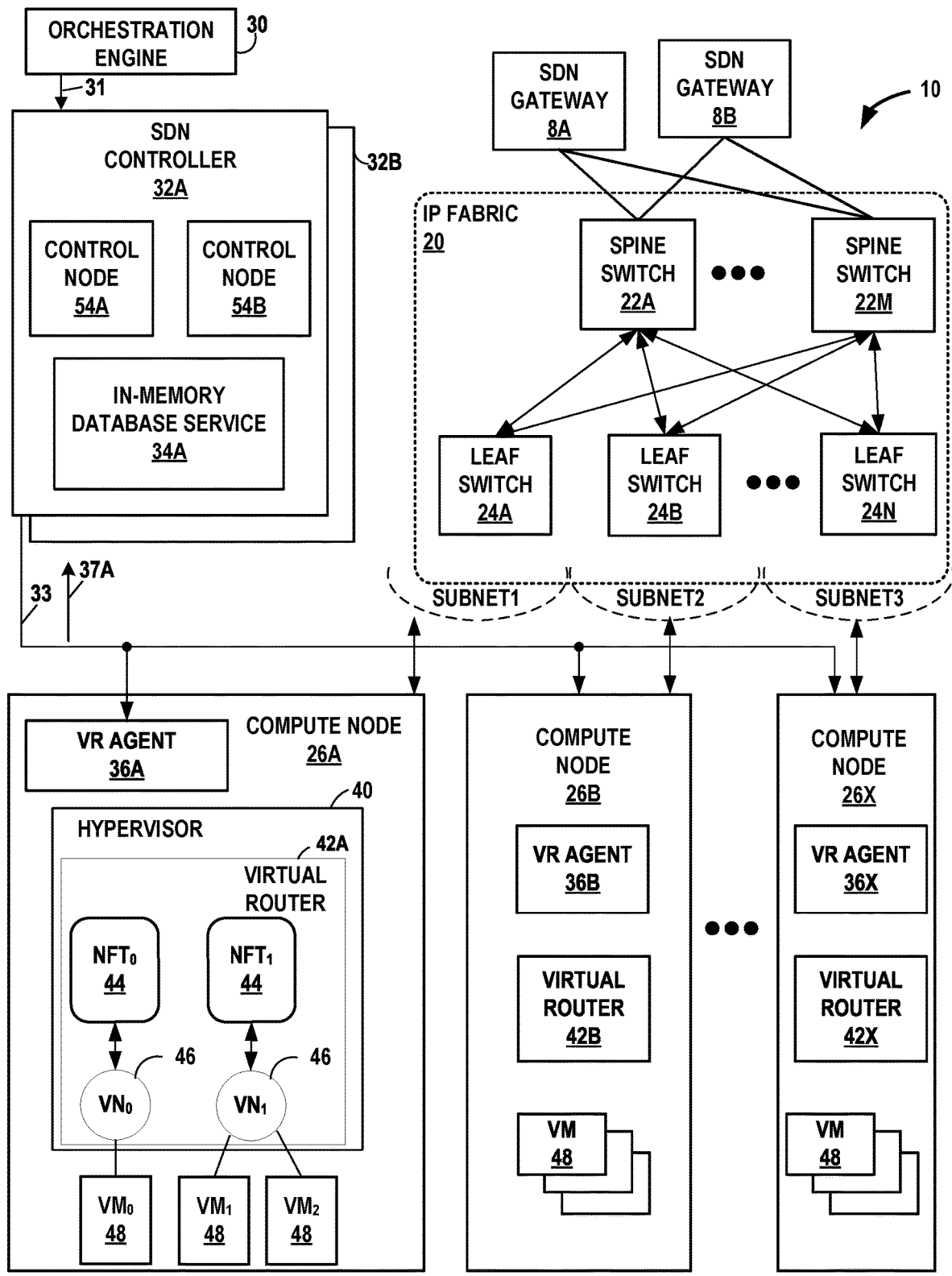
FIG. 2 is a block diagram illustrating an example implementation of the data center of FIG. 1 in further detail, in accordance with one or more aspects of the techniques of this disclosure.

FIG. 2 is a block diagram illustrating an example implementation of data center 10 of FIG. 1 in further detail, in accordance with the techniques of this disclosure. In the example of FIG. 2, data center 10 includes compute nodes 26A-26X that include virtual routers 42A-42X (collectively, "virtual routers 42," sometimes referred to as "vrouter"). Responsive to instructions received from SDN controller 32A, virtual routers 42 dynamically create and manage one or more virtual networks ("$VN_1$, $VN_0$") 46 usable for communication between application instances.

In one example, virtual routers 42 execute the virtual network as an overlay network, which provides the capability to decouple an application's virtual address from a physical address (e.g., IP address) of the one of compute nodes 26A-26X ("compute nodes 26") on which the application is executing. Each virtual network may use its own addressing and security scheme and may be viewed as orthogonal from the physical network and its addressing scheme. Various techniques may be used to transport packets within and across virtual networks 46 over the physical network.

Each of virtual routers 42 executes within a hypervisor, a host operating system, or other component of each of compute nodes 26. Each of compute nodes 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of compute nodes 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks $VN_0$-$VN_1$ and represents tenant VMs running customer applications such as Web servers, database servers, enterprise applications, or hosting virtualized services used to create service chains. In some cases, any one or more of compute nodes 26 or another computing device hosts customer applications directly, i.e., not as virtual machines. Virtual machines as referenced herein, e.g., VMs 48, compute nodes 26, or a separate computing device that hosts a customer application may be referred to alternatively as "hosts."

Each interface of VMs 48 running on the host is connected to a VRF that contains the forwarding tables for the corresponding network that contains the IP address of that interface. A vRouter only has VRFs for networks that have interfaces in them on that host, including the Fabric VRF that connects to the physical interface of the host. Virtual networking uses encapsulation tunneling to transport packets between VMs 48 on different hosts, and the encapsulation and decapsulation happens between the Fabric VRF and the VM VRFs.

In general, each of VMs 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications, but is unaware of an IP address of the physical compute node 26A on which the virtual machine is executing. In this way, a "virtual address" is an address for an application that differs from the logical address for the underlying, physical computer system, e.g., compute node 26A in the example of FIG. 2. The virtual addresses may also be referred to herein as "virtual interfaces."

In one implementation, each of compute nodes 26 includes a corresponding one of VR agents 36A-36X that communicates with SDN controller 32A and, responsive thereto, directs virtual router 42 so as to control the overlay of virtual networks 46 and coordinate the routing of data packets within compute node 26. In general, each VR agent 36 communicates with SDN controller 32A, which generates commands to control routing of packets through data center 10.

VR agents 36 execute in user space and operate as a proxy for control plane messages between VMs 48 and SDN controller 32A. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each compute node 26A further includes an orchestration agent (not shown in FIG. 2) that communicates directly with orchestration engine 30. For example, responsive to instructions from orchestration engine 30, the orchestration agent communicates attributes of the particular VMs 48 executing on the respective compute node 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of compute nodes 26. As another example, encapsulation and decapsulation functions are performed at the edge of IP fabric 20 at a first-hop leaf switch 24 (e.g., top-of-rack (TOR)) that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, SDN controller 32A provides a logically centralized controller for facilitating operation of one or more virtual networks within data center 10. For example, SDN controller 32A maintains a routing information base, e.g., one or more routing tables that store routing information for the physical network as well as one or more overlay networks of data center 10. Similarly, virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, virtual machine $VM_1$ 48 may send an "inner packet," to virtual router 42A by an internal link. Virtual router 42A uses NFL to look up a virtual network destination network address for the packet. NFL specifies an outbound interface for virtual router 42A and encapsulation for the packet. Virtual router 42A applies the encapsulation to add a tunnel header to generate an outer packet and outputs the outer packet on the outbound interface, in this case toward leaf switch 24A.

The routing information, for example, maps packet key information (e.g., destination IP information and other select information from packet headers) to one or more specific next hops within the networks provided by virtual routers 42 and IP fabric 20. In some cases, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through IP fabric 20. In this way, network packets associated with any of virtual machines 48 may be transported as encapsulated packet communications via the overlay network.

Each of VR agents 36 may send messages to SDN controller 32A over XMPP sessions between the VR agents and the control node, the messages conveying virtual routes to the virtual interfaces (virtual addresses) of the VMs of compute nodes 26. The virtual routes may also be referred to herein as overlay network routes. For example, VR agent 36A sends an XMPP message 37A containing virtual route(s) for compute node 26A. SDN controller 32A receives the messages and stores the virtual routes to overlay routing information, and may in turn advertise one or more of the overlay routes received from a first VR agent 36 to SDN gateways 8 (e.g., via Multi-Protocol extensions for BGP (MP-BGP)). MP-BGP is an extension to BGP that allows different address families to be distributed. SDN controller 32A may also advertise the overlay routes to other control nodes 54, if there is a gateway router between the two clusters. In some examples, any of the virtual routes may include a prefix, a next hop address associated with a server of compute nodes 26, and a label or other data to identify a virtual routing and forwarding instance configured at the next hop server. Every control node of the SDN controller advertises the XMPP routes received from the compute nodes towards other BGP speakers as VPNv4 routes. The BGP speakers can include other control nodes 54 as well as external BGP speakers such as SDN gateway 8.

One example of an IP-based VPN is described more fully in Rosen et al., "BGP/MPLS IP Virtual Private Networks (VPNs)," Request for Comments 4364, Network Working Group, February 2006, the entire contents of which are incorporated by reference herein. Further details of BGP-signaled IP/VPNs are described in S. Mackie et al., "BGP-Signaled End-System IP/VPNs," Network Working Group Internet-Draft, Dec. 15, 2016, the entire contents of which are incorporated by reference herein. Multiprotocol extensions for BGP are described in T. Bates et al., "Multiprotocol Extensions for BGP-4," Request for Comments 4760, Network Working Group, January 2007, the entire contents of which are incorporated by reference herein.

In accordance with the techniques of this disclosure, the control node 54 still performs its usual functions except for publishing routes toward the compute node. Instead, for this function an in-memory database service 34A that executes within the same SDN controller 32 handles publishing the routes to the compute nodes 26, based on subscriptions from compute nodes 26. Compute nodes 26 can easily subscribe or unsubscribe to a routing instance at any point of time.

Control nodes 54 may each be virtual machines or containers running on one or more of a cluster of servers that make up SDN controller 32A. In some examples, in-memory database service 34A can be launched as a container by itself, in a separate container but at the same place where the control node container is also running. In some example implementations, there may be a one-to-one relationship between control node and in-memory database service instance, with one container in each control node server. When serving the same data channel, the in-memory database service can synchronize the routing information between the different control nodes 54. In this way, the in-memory database service has a copy of the control node's routing information, and an in-memory database service on a first routing instance has same routes as in-memory database service on a second routing instance. In this way, each active controller has a corresponding in-memory database container operating as the pub-sub service in memory to handle the routes exchanged from the control nodes 54 to the compute nodes 26.

This avoids an unnecessary spike in the control node when a control node connected to multiple compute nodes goes down, so that control nodes 54 do not become overloaded when doing a lot of route updates in, e.g., during an active-active failure or software upgrade.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3A:
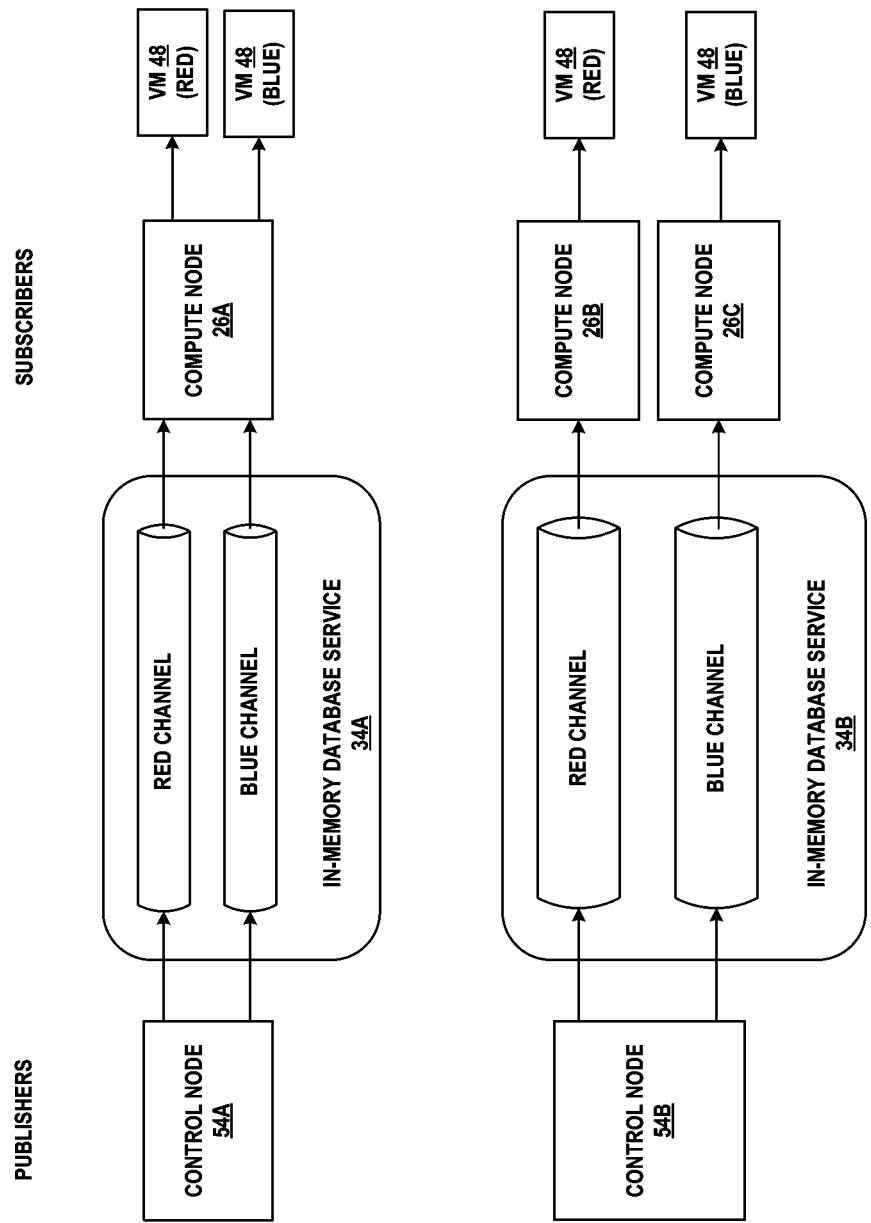
FIGS. 3A and 3B are block diagrams illustrating an example implementation of some computing devices of the data center of FIG. 2 in further detail, in accordance with one or more aspects of the techniques of this disclosure.
Figure 3B:
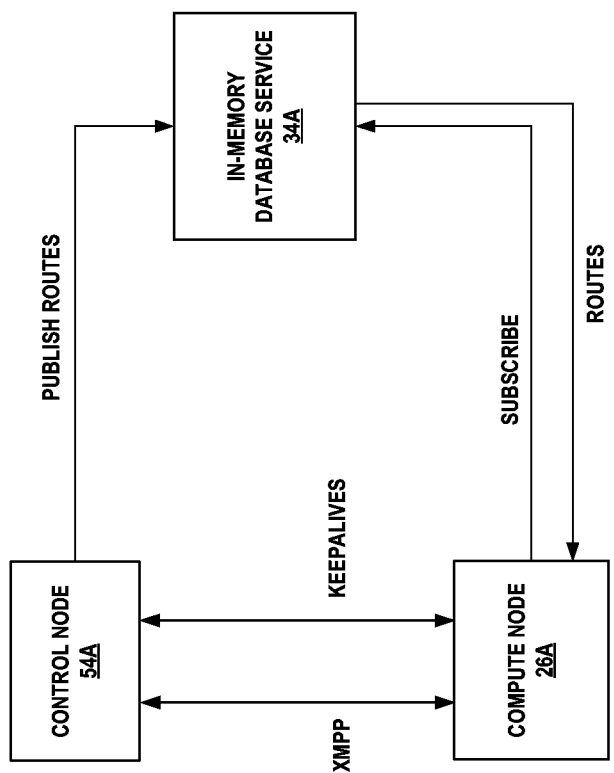

FIGS. 3A and 3B are block diagrams illustrating an example implementation of some computing devices of the data center of FIG. 2 in further detail, in accordance with one or more aspects of the techniques of this disclosure. In the example of FIG. 3A, each of control nodes 54A and 54B has a respective in-memory database service 34A, 34B by which it communicates route updates to compute nodes that have subscribed to receive the route updates. In some examples, the pub-sub model has its own messaging system that is defined by the in-memory database services 34A-34B ("in-memory database services 34"). The messaging system may include a message service API. The in-memory database service 34 may build a publish model. In FIG. 3A, control node 54A publishes route updates to a red channel and a blue channel within in-memory database service 34A. Compute node 26A subscribes to the red channel and the blue channel of in-memory database service 34A. Compute node 26A forwards traffic associated with a red VM 48 and a blue VM 48.

Control node 54B similarly publishes route updates to a red channel and a blue channel within in-memory database service 34B. Compute node 26B subscribes to the red channel of in-memory database service 34B and compute node 26C subscribes to the blue channel of in-memory database service 34B. Compute node 26B forwards traffic associated with a red VM 48 based on routes received by subscribing to the red channel and compute node 26C forwards traffic associated with a blue VM 48 based on routes received by subscribing to the blue channel.

FIG. 3B illustrates an example message flow between compute node 26A, control node 54A, and in-memory database service 34A. Control node 54A sends XMPP messages bearing configuration information to compute node 26A. Compute node 26A sends XMPP messages advertising routes for VRFs.

Compute node 26A subscribes to a particular instance of the in-memory database service 34A by sending a subscribe message to SDN controller 32A. Control node 54A does not see compute node 26A as a subscriber. Subscriber requests for a particular kind of update are stored in the in-memory database service 34A as subscriber state. In other examples, compute node 26A sends a separate message directly to in-memory database service 34A to subscribe to the routing instance. This message may be sent in accordance with a message service, such as Java Message Service (JMS) API, for example.

Control node 54A simply publishes the routes to the in-memory database service instance using the message service API. Control node 54A does not need to store state information keeping track of which compute node the routes need to be sent to or send the routes to individual compute nodes.

Control node 54A and in-memory database service 34A have a unidirectional communication, by which control node 54A publishes routes to in-memory database service 34A. In-memory database service 34A in turn sends those routes that are in the VRF to the compute node 26A as the subscriber. Any time a route update is received for that particular routing instance, in-memory database service 34A instantaneously publishes the route update to any compute nodes 26 that have subscribed to the routing instance. This may improve the execution speed and the amount of processing power taken up on the control node. Route withdrawals are similarly published to the compute node 26A subscriber.

Figure 4:
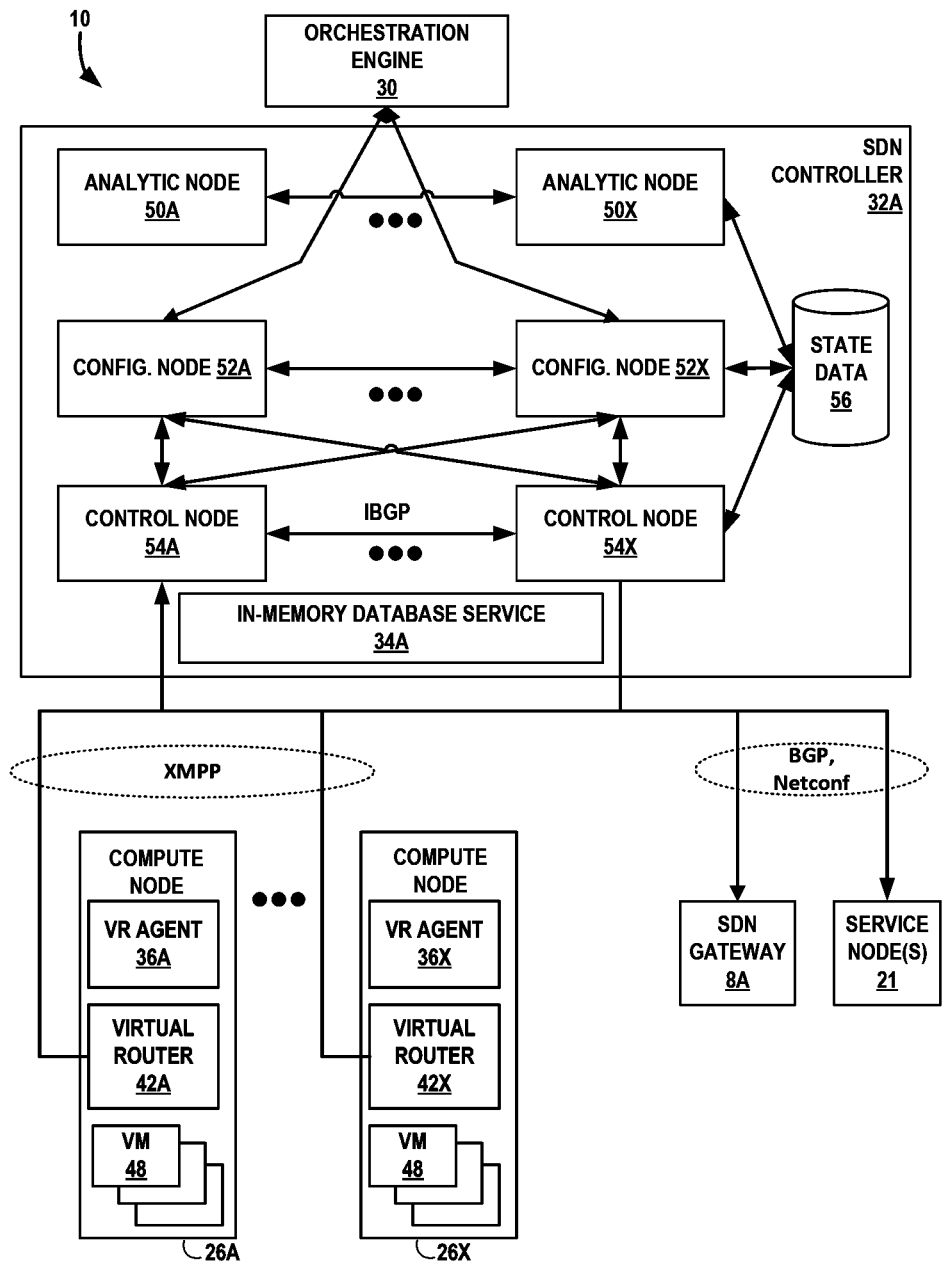
FIG. 4 is a block diagram illustrating an example implementation of the data center of FIG. 2 in further detail.

FIG. 4 is a block diagram illustrating an example implementation of the data center of FIG. 2 in further detail. In the example of FIG. 4, SDN controller 32A includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the analytic nodes 50, configuration nodes 52, and control nodes 54 may be implemented as a separate software process, and the nodes may be distributed across multiple hardware computing platforms that provide an environment for execution of the software. Moreover, each of the nodes maintains state database 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower-level models suitable for interacting with network elements, such as physical spine switches 22 and leaf switches 24, and VR agents 36. Configuration nodes 52 keep a persistent copy of the configuration state of SDN controller 32A within state database 56 ("STATE DATA 56").

Control nodes 54 implement a logically centralized control plane responsible for maintaining ephemeral network state. Control nodes 54 interact with each other and with network elements, such as VR agents 36 and virtual routers 42 of compute nodes 26, to ensure that the network state is eventually consistent with desired state as specified by orchestration engine 30. In general, control nodes 54 receive configuration state information of SDN controller 32A from configuration nodes 52, and exchange routes with each other via IBGP to ensure that all control nodes 54 have the same network state. Further, control nodes 54 exchange routes with SDN gateway 8A via BGP, and exchange the configuration state of SDN controller 32A with service nodes 21 via Netconf.

In some examples, configuration nodes 52 present a northbound API that interfaces with orchestration engine 30. Orchestration engine 30 uses this interface to install configuration state using the high-level data model. Configuration nodes 52 further include a message bus to facilitate communications among internal components. Configuration nodes 52 further include a transformer that discovers changes in the high-level model of orchestration engine 30 and transforms these changes into corresponding changes in the low-level data model managed by SDN controller 32A. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

SDN controller 32A also includes an in-memory database service 34A, as described herein. The in-memory database service 34A may provide a publish-subscribe function for multiple control nodes 54 of SDN controller 32A. In some examples, in-memory database service 34A includes multiple channels. In some examples, each channel is associated with a different routing instance. In some examples, each channel corresponds to a different one of the plurality of control nodes. In-memory database service 34A may communicate with control nodes 54A and compute nodes 26 via a message service API, for example. In-memory database service 34A may be in a separate container distinct from any containers in which the control nodes reside.

The architecture of data center 10 illustrated in FIG. 4 is shown for purposes of example only. The techniques as set forth in this disclosure may be implemented in the example data center 10 of FIG. 4, as well as other types of data centers not described specifically herein. Nothing in this disclosure should be construed to limit the techniques of this disclosure to the example architecture illustrated by FIG. 4.

Figure 5:
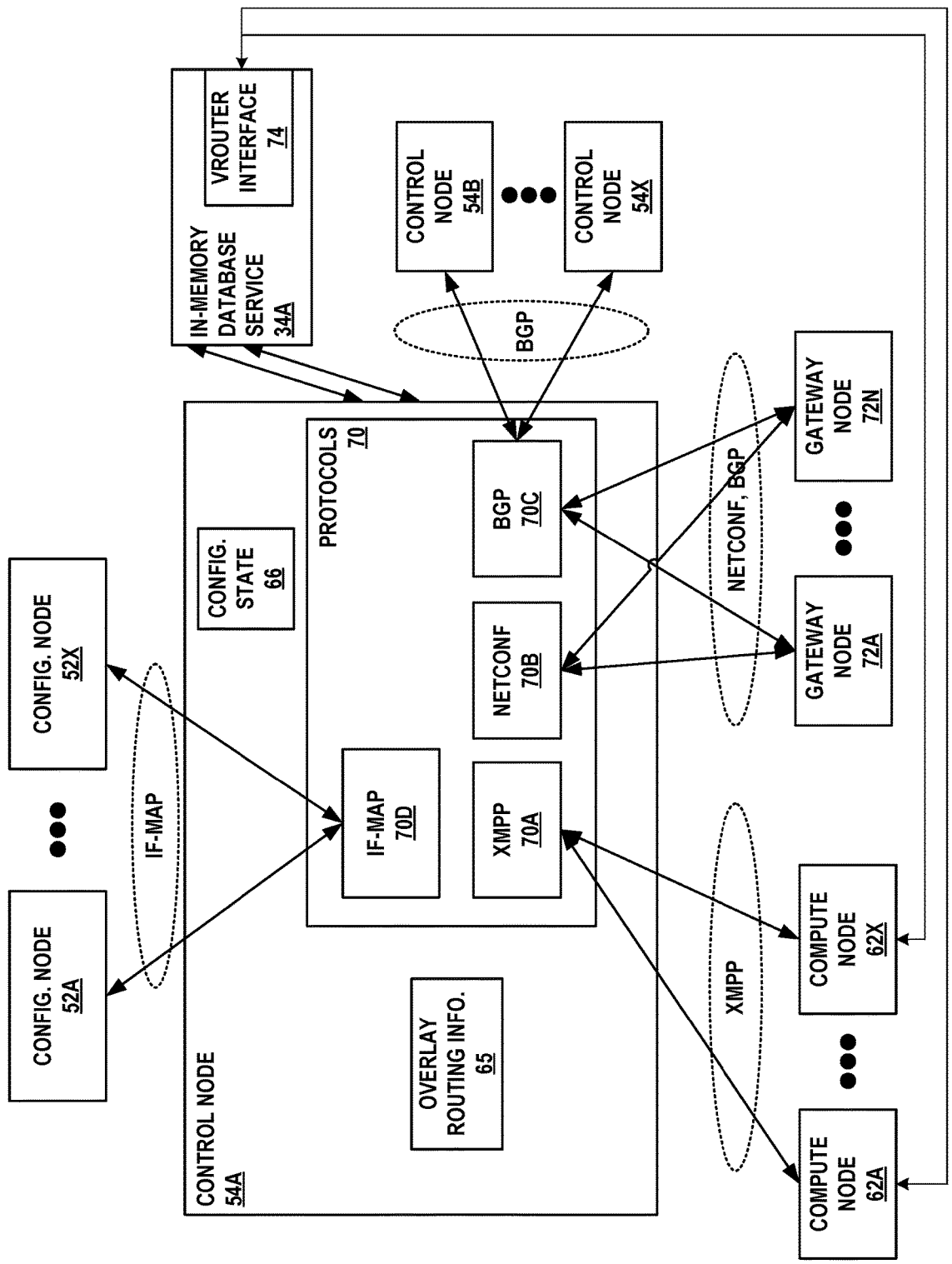
FIG. 5 is a block diagram illustrating an example of a control node of an SDN controller in further detail in accordance with one or more aspects of the techniques of this disclosure.

FIG. 5 is a block diagram illustrating an example of a control node of an SDN controller in further detail in accordance with the techniques of this disclosure. Control node 54 is configured to communicate with multiple other types of nodes, including configuration nodes 52A-52X ("config. nodes 52"), other control nodes 54B-54X, compute nodes 62A-62X ("compute nodes 62"), and gateway nodes 72A-72N ("gateway nodes"). Control node 54 also communicates with IP fabric 20, which, as described herein, may be made up of devices including spine switches and leaf switches, for example. Control node 54A provides an operating environment for protocols 70 to execute. Protocols 70 may include, for example, an XMPP process 70A, a NETCONF process 70B, a BGP process 70C, and an IF-MAP process 70D.

The control nodes receive configuration state from the configuration nodes using IF-MAP. The control nodes exchange overlay network routes with other control nodes using IBGP to ensure that all control nodes have the same overlay network state. The control nodes exchange overlay network routes (e.g., VPN routes) with the vRouter agents on the compute nodes using XMPP. The control nodes also use XMPP to send configuration state such as routing instances and forwarding policy. The control nodes proxy certain kinds of traffic on behalf of compute nodes. These proxy requests are also received over XMPP. The control nodes exchange overlay network routes with the gateway nodes (routers and switches) using BGP. The control nodes also send configuration state using NETCONF.

Control node 54A receives configuration information from one or more of config. nodes 52 using Interface to Metadata Access Points (IF-MAP) process 70D. IF-MAP process 70D may include circuitry for executing software instructions for sending and receiving communications from config nodes 52 in accordance with the IF-MAP protocol. IF-MAP process 70D stores the configuration information received from configuration nodes 52 to configuration state 66 ("CONFIG. STATE 66").

Control node 54A exchanges BGP messages with BGP peers, including control nodes 54B-54X and gateway nodes 72 using BGP process 70C. Gateway nodes 72 may include one or more SDN routers such as SDN gateways 8. BGP process 70C may implement multi-protocol BGP (MP-BGP), for example. BGP process 70C may include circuitry for executing software instructions for sending and receiving BGP messages with control nodes 54B-54X in accordance with the BGP protocol, including MP-BGP update messages. BGP process 70C stores overlay network routes received from BGP route advertisements from gateway nodes 72 and control nodes 54B-54X to overlay routing information 65.

Control node 54A exchanges messages with compute nodes using XMPP process 70A in accordance with XMPP. Control node 54A exchanges the messages via XMPP sessions. Compute nodes 62 may correspond to compute nodes 26 of FIGS. 1-3. XMPP process 70A may include circuitry for executing software instructions for exchanging XMPP messages with compute nodes 62 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein. Control node 54A (and more specifically, XMPP process 70A of control node 54A) may serve as an XMPP client or an XMPP server relative to one of compute nodes 62, depending on the context. For example, control node 54A may act as an XMPP server, and compute nodes 62 may be XMPP clients that subscribe to information published by control node 54A, such as configuration information from configuration state 66 for individual compute nodes 62.

As another example, control node 54A may act as an XMPP client to one or more of compute nodes 62 as XMPP servers, in which control node 54A subscribes to information published by compute nodes 62, such as routing information learned by compute nodes 62 from other sources. XMPP process 70A receives overlay network routes from compute nodes 62A via an XMPP session and stores the overlay network routes to overlay routing information 65. Overlay network routes learned by XMPP process 70A may be leaked to BGP process 70C, and BGP process 70C in turn may send to its BGP peers (e.g., other compute nodes or SDN gateways) BGP routing advertisements that advertise the overlay network routes in overlay routing information 65 learned from compute nodes 62 via XMPP. In some examples, NETCONF process 70B of control node 54A enables control node 54A to communicate with gateway nodes 72 via the NetConf protocol.

In accordance with the techniques of this disclosure, control node 54A does not directly publish overlay routes (VPN routes) from overlay routing information 65 to individual compute nodes 62, but instead simply publishes learned VPN routes to in-memory database service 34A.

Compute node 62A subscribes to a particular instance of the in-memory database service 34A by sending a subscribe message to SDN controller 32A. Control node 54A does not see compute node 62A as a subscriber. Subscriber requests for a particular kind of update are stored in the in-memory database service 34A as subscriber state. In some examples, compute node 62A sends a separate message directly to in-memory database service 34A subscribe to the routing instance. This message may be sent in accordance with a message service, such as Java Message Service (JMS) API, for example.

In some example implementations, the same XMPP message is processed both by the control node container VM and the in-memory database service 34A container VM. For example, in-memory database service 34A can open a different socket and still understand the same message coming in. Both in-memory database service 34A and control node 54A can listen to incoming XMPP messages and process them. In-memory database service 34A includes a vRouter interface 74 that communicates with vRouters of compute nodes 62. vRouter interface 74 may be a shim layer that listens to incoming XMPP messages directed to the controller and processes them as if they are subscription requests. In this way, the in-memory database service is integrated with the SDN controller.

In response to XMPP process 70A receiving an XMPP message from one of compute nodes 62 advertising a route associated with a new VM on the one of compute nodes 62, node 54A simply publishes the routes to the in-memory database service instance using the message service API. Control node 54A does not need to store state information keeping track of which compute node the routes need to be sent to or send the routes to individual compute nodes. In-memory database service 34A in turn sends the routes to any of compute nodes 62A-62X that have previously subscribed to receiving route updates from a routing instance associated with control node 54A. The compute nodes 62A receive and store the routes to their forwarding information, and forward VM traffic based on the received routes. Route withdrawals are communicated similarly.

Figure 6A:
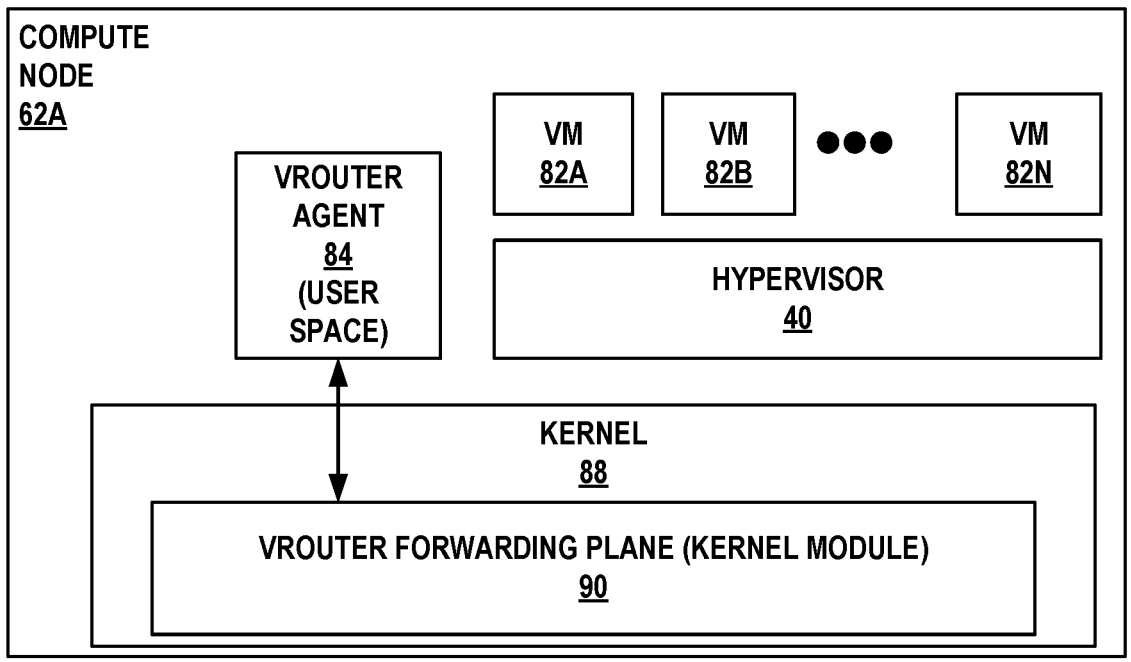
FIGS. 6A-6B are block diagrams illustrating examples of a compute node in further detail, in accordance with one or more aspects of the techniques of this disclosure.
Figure 6B:
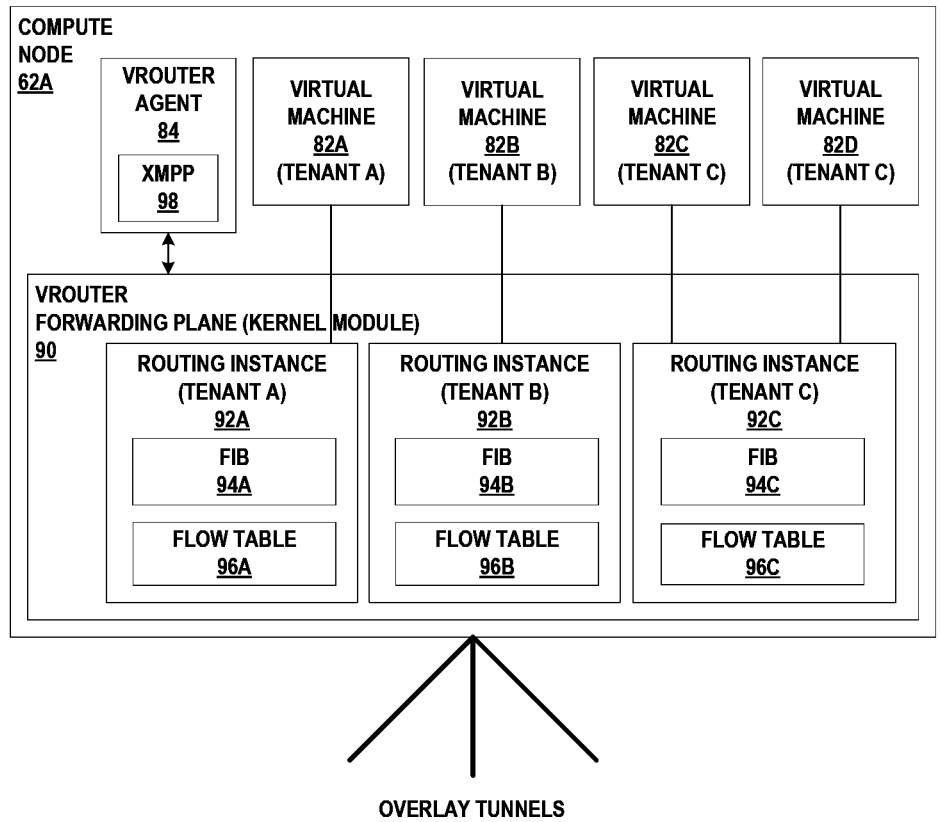

FIGS. 6A-6B are block diagrams illustrating examples of a compute node in further detail, in accordance with the techniques of this disclosure. In the example of FIGS. 6A-6B, the compute node is compute node 62A of FIG. 5. Compute node 62A may be one of compute nodes 26 of FIGS. 1-4. Compute node 62A hosts VMs 82A-82N ("VMs 82"), and may be, for example, a general-purpose x86 server. VMs 82 are tenant VMs running customer applications such as Web servers, database servers, enterprise applications or hosting virtualized services used to create service chains, for example. In one example configuration, Linux is the host operating system (OS).

Two components in a compute node implement a virtual router; namely, the vRouter agent 84 and the vRouter forwarding plane 90. The vRouter forwarding plane 90 is located in the kernel (e.g., Linux), and the vRouter agent 84 is the local control plane.

The vRouter agent 84 is a user space process running inside the kernel. The vRouter agent 84 acts as the local, lightweight control plane and is responsible for the following functions. The vRouter agent 84 exchanges control state such as routes with the control nodes 54 using XMPP sessions. The vRouter agent 84 receives low-level configuration state such as routing instances and forwarding policy from the control nodes 54 using XMPP. The vRouter agent 84 reports analytics state such as logs, statistics, and events to the analytics nodes 50 (FIG. 4). The vRouter agent 84 installs forwarding state into the vRouter forwarding plane 90. The vRouter agent 84 may discover the existence and attributes of VMs in cooperation with a Nova agent of compute node 62A (not shown). The vRouter agent 84 applies forwarding policy for the first packet of each new flow and installs a flow entry for the flow in the flow table of the forwarding plane. The vRouter agent 84 may proxy one or more of DHCP, ARP, DNS, and MDNS, for example. Additional proxies may be included in some implementations. Each vRouter agent 84 is connected to at least two control nodes 54 for redundancy in an active-active redundancy model.

Compute node 62A participates in the publish-subscribe model described herein, where the control nodes publish route updates to the in-memory data store and vRouter agent 84 subscribes to receive route updates from the in-memory data store. For example, a control node of an SDN controller publishes route updates to an in-memory data store of the SDN controller, and the compute node 62A that is managed by the SDN controller subscribes to receive the route updates from the in-memory data store. Route updates may include routes that are being added (e.g., through new virtual machines 84 being instantiated) or routes being deleted. vRouter agent 84 receives route updates from the in-memory database service, and updates vRouter forwarding plane 90 based on the route updates. Network traffic is then sent or received to or from VMs 82 based on the vRouter forwarding plane state.

FIG. 6B illustrates the virtual router ("vRouter") forwarding plane 90 of compute node 62A in further detail. The vRouter forwarding plane 90 runs as a loadable kernel process (e.g., in Linux). The vRouter forwarding plane 90 is responsible for the following functions: vRouter forwarding plane 90 enables encapsulating packets to be sent to the overlay network and decapsulating packets to be received from the overlay network.

Routing instances 92A-92C, for respective tenants A, B, and C, represent virtual routing and forwarding instances ("VRFs"). Routing instances 92A-92C ("routing instances 92") include corresponding FIBs 94A-94C ("FIBs 94") and flow tables 96A-96C ("flow tables 96"). VRouter forwarding plane 90 may include an additional VRF called a "fabric VRF" (not shown). The vRouter forwarding plane 90 assigns packets to a routing instance 94. Packets received from the overlay network are assigned to a routing instance based on the MPLS label or Virtual Network Identifier (VNI). Virtual interfaces to local virtual machines are bound to routing instances 92. The vRouter forwarding plane 90 does a lookup of the destination address in the forwarding information base (FIB) 94, also known as a forwarding table, and forwards the packet to the correct destination. The routes may be Layer 3 IP prefixes or Layer 2 MAC addresses, for example.

A forwarding policy can be applied using a flow table 96: The vRouter forwarding plane 90 matches packets against the flow table and applies the flow actions. The vRouter forwarding plane 90 sends the packets for which no flow rule is found (that is, the first packet of every flow) to the vRouter agent 84, which then installs a rule in the flow table 96. The vRouter forwarding plane 90 sends certain packets such as DHCP, ARP, MDNS to the vRouter agent for proxying.

Each interface of VMs 82 running on the host is connected to a VRF (routing instance 92) that contains the forwarding tables for the corresponding network that contains the IP address of that interface. A vRouter only has VRFs for networks that have interfaces in them on that host, including the Fabric VRF that connects to the physical interface of the host. Virtual networking uses encapsulation tunneling to transport packets between VMs 82 on different hosts, and the encapsulation and decapsulation happens between the Fabric VRF and the VM VRFs (routing instances 92).

When a new virtual workload is created, an event is seen in the orchestration engine 30 and sent into SDN controller 32A, which then sends requests to the vRouter agent 84 for routes to be installed in the VRFs for virtual networks, and the vRouter agent 84 then configures them in the forwarder.

The logical flow for configuring networking on a new VM with a single interface is as follows: Networks and network policies are defined in either the orchestrator or Networking using UI, CLI, or REST API. A network is primarily defined as a pool of IP addresses which will be allocated to interfaces when VMs are created.

A VM is requested to be launched by a user of the orchestrator, including which network its interface is in. The orchestrator selects a host for the new VM to run on, and instructs the vrouter agent 84 on that host to fetch its image and start the VM. Events or API calls are received from the networking service of the orchestrator instructing to set up the networking for the interface of the new VM that will be started. These instructions are converted into REST calls and sent to the SDN controller 32. The SDN controller 32 sends a request to the vRouter agent 84 for the new VM virtual interface to be connected to the specified virtual network. The vRouter agent 84 instructs the vRouter forwarding plane 90 to connect the VM interface to the routing instance 92 for the virtual network. The routing instance 92 (VRF) is created, if not present, and the interface is connected to it.

The vRouter agent 84 starts the VM which will usually be configured to request IP addresses for each of its interfaces using DHCP. The vRouter agent 84 proxies the DHCP requests and responds with the interface IP, default gateway, and DNS server addresses. Once the interface is active and has an IP address from DHCP, the vRouter agent 84 will install routes to the VM's IP address and MAC address with a next hop of the VM virtual interface. The vRouter agent 84 assigns a label for the interface and installs a label route in the MPLS table (e.g., FIB 94).

VRouter agent 84 uses XMPP process 98 to establish an XMPP session with a control node of the SDN controller. XMPP process 98 of vRouter agent 84 learns overlay network routes to virtual interfaces (virtual addresses) from VMs 82, and stores these as virtual routes for the virtual interfaces to FIBs 94. XMPP process 98 sends XMPP messages via the XMPP session to control nodes 54 to advertise the overlay network routes. For example, the vRouter agent 84 sends an XMPP message 37A to the SDN controller 32 containing a route to the new VM. The route has a next hop of a network address of the server that the vRouter is running on (e.g., an IP address including IPv4 or IPv6), and specifies an encapsulation protocol using the label that was just allocated.

Compute node 62A sends a message subscribing to receive routes from an in-memory database service. In some examples, the message is an XMPP discovery message that is sent when a virtual router comes up or to advertise routes, which the control node receives and processes normally and the in-memory database service also interprets as a subscription message. In other examples, the message is sent using a message service API, such as JMS API. Compute node 26B receives the route update from the in-memory database service. Compute node 26B stores the route update to its forwarding information, such as one of FIBs 94. Compute node 26B then forwards virtual machine traffic to compute node 26A based on the updated forwarding information.

The control node of the SDN controller 32 publishes the route to the new VM to the in-memory database service 34A, which in turn publishes the route to any other vRouters with VMs in the same network and in other networks, based on which vRouters have subscribed to the routing instance. The vRouter agent 84 receives virtual routes published by the in-memory database service 34A, and stores the overlay network routes to overlay routing information and one or more of FIBs 94. At the end of this procedure, the routes in the VRFs of all the vRouters in the data center have been updated to implement the configured network policies, taking account of the new VM.

The in-memory database service may store the data as tables, and can send the entries of the tables in any suitable manner. The vRouter Agent is configured to recognize routes published by the in-memory database service. In some examples, the published routes may be sent in the form of an XMPP message with an added field being a subscription flag of VRF name, to enable interaction with the in-memory database service. In this manner, in some example implementations the XMPP messages can be utilized as a mechanism to manage the pub-sub function. In other examples, a message service such as JMS API may be used to manage the pub-sub function.

Figure 7:
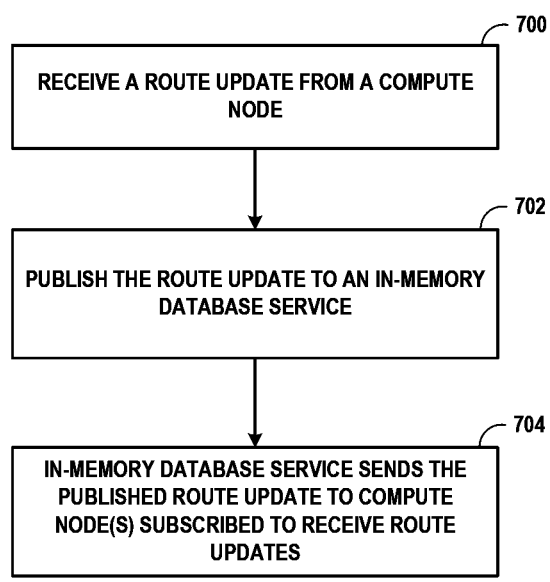
FIG. 7 is a flowchart illustrating example operation of an SDN controller in accordance with one or more aspects of the techniques of this disclosure.

FIG. 7 is a flowchart illustrating example operation of a network system such as an SDN controller in accordance with the techniques of this disclosure. FIG. 7 may illustrate example operation of an SDN controller such as SDN controller 32A or 32B of FIG. 1-2 or 4, for example. FIG. 7 may illustrate example operation of a control node 54A-54N of FIGS. 3A-5, for example. A control node, such as control node 54A, receives a route update from a compute node, such as compute node 26A (700). More specifically, the route update may be received from a virtual router executing on a compute node. The route update may be an overlay network route, such as a VPN route, such as a VPNv4 route. The route update may indicate a route, or a route withdrawal (such as in the case of a compute node becoming unreachable). The route update may be sent, for example, via an XMPP message from the virtual router. The compute node 26A may be one of several compute nodes in a network. In response to receiving the route update, the control node publishes the route update to an in-memory database service of the SDN controller (702). The in-memory database service in turn sends the route update to any compute nodes that have subscribed to receive route updates for an in-memory database instance associated with the control node (704).

Although described for purposes of example in terms of an SDN controller, in some examples the techniques of FIG.

7 may be implemented by a network device other than an SDN controller. In addition, while the techniques are described with respect to advertising overlay network routes that include virtual network addresses for virtual machines executing on compute nodes, the techniques are similarly applicable to other types of workloads, such as containers. For instance, a container may execute as part of a pod workload on a compute node, the pod being assigned a virtual network address by the SDN platform and operating as a virtual network destination.

Figure 8:
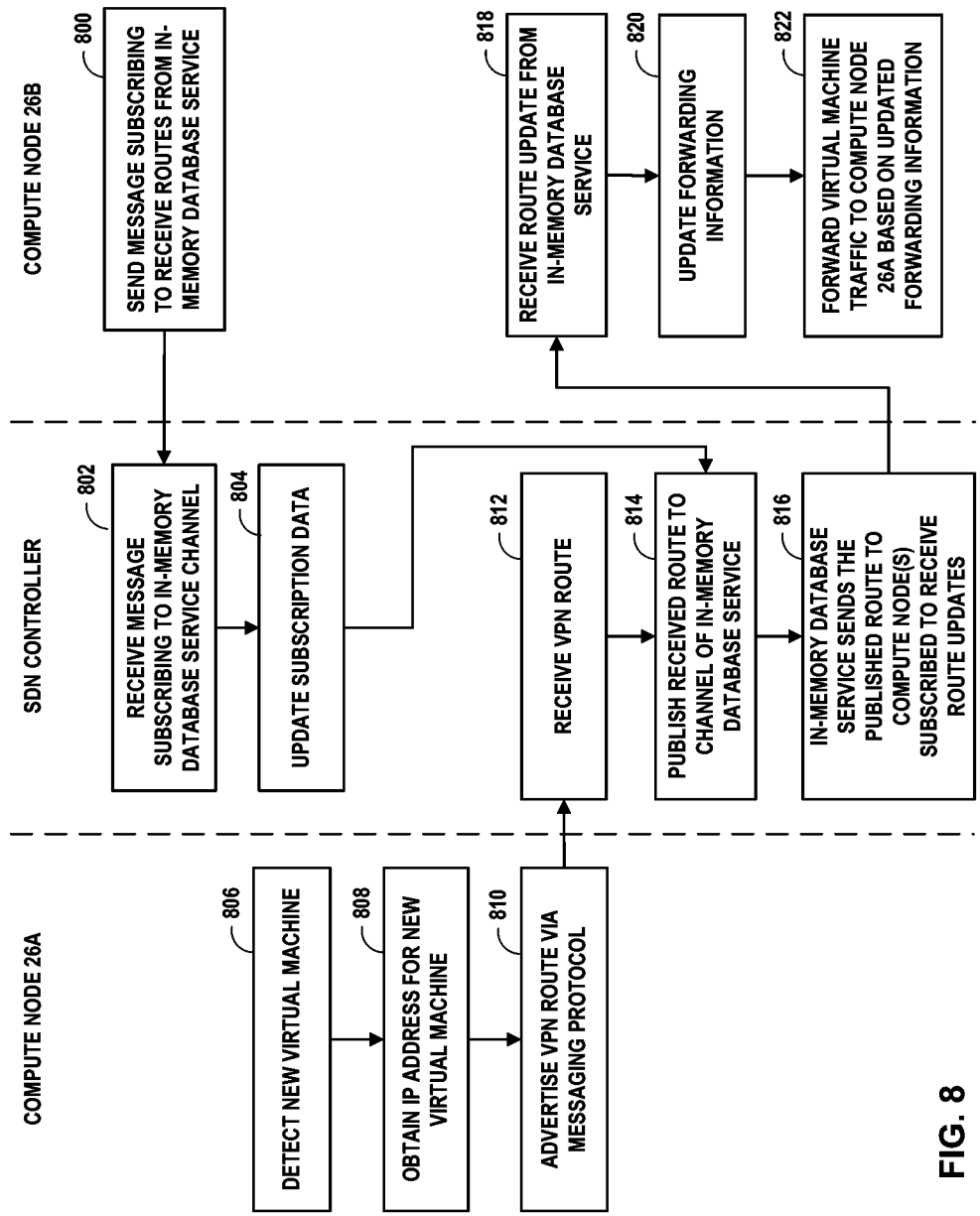
FIG. 8 is a flowchart illustrating example operation of network devices, in accordance with the techniques of this disclosure.

FIG. 8 is a flowchart illustrating example operation of network devices, in accordance with the techniques of this disclosure. FIG. 8 may illustrate example operation of a compute node such as any of compute nodes 26 of FIG. 1-4 or any of compute nodes 62 of FIG. 5-6B. FIG. 8 may illustrate example operation of an SDN controller such as SDN controller 32A or 32B of FIG. 1-2 or 4, for example. FIG. 8 may illustrate example operation of a control node 54A-54N of FIGS. 3-5 and 6A, for example.

A compute node, such as compute node 26B, sends a message subscribing to receive routes from an in-memory database service (800). In some examples, the message is an XMPP discovery message that is sent when a virtual router comes up or to advertise routes, which the control node receives and processes normally and the in-memory database service also interprets as a subscription message. In other examples, the message is sent using a message service API, such as JMS API. The in-memory database service of the SDN controller receives the message from the compute node subscribing to the in-memory database service channel (802), and updates subscription data to indicate that the compute node 26B has subscribed to a channel of the in-memory database service (804).

In parallel with, prior to, or subsequent to the previously mentioned steps, compute node 26A detects a new virtual machine (806), such as described above. The compute node obtains an IP address for new virtual machine (808). The compute node advertises an overlay network route via a messaging protocol (810), such as XMPP, to the control node of the SDN controller. The control node of the SDN controller receives the overlay network route from the compute node via the XMPP session (812). In response to receiving the route, the control node publishes the route to an in-memory database service of the SDN controller (814). The in-memory database service in turn sends the route update to any compute nodes that have subscribed to receive route updates for an in-memory database instance associated with the control node (816). In some examples, the in-memory database service sends the message using the message service API.

Compute node 26B receives the route update from the in-memory database service (818). Compute node 26B stores the route update to its forwarding information, such as one of FIBs 94 (FIG. 6B) (820). Compute node 26B then forwards virtual machine traffic to compute node 26A based on the updated forwarding information (822).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, process or components may be implemented together or separately as discrete but interoperable logic devices. Depiction of different features as process or units is intended to highlight different functional aspects and does not necessarily imply that such process or units must be realized by separate hardware or software components. Rather, functionality associated with one or more process or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
receiving, by an in-memory database service of a software-defined network (SDN) controller, a message from a first compute node of a plurality of compute nodes, the message subscribing the first compute node to receive route updates for an in-memory database instance associated with a control node of the SDN controller;
storing, by the in-memory database service, subscription data based on the message from the first compute node;
receiving, by the control node, a route from a second compute node of the plurality of compute nodes;
publishing, by the control node using a message service application programming interface (API) and in response to receiving the route, a route update to the in-memory database instance associated with the control node; and
sending, by the in-memory database service in response to receiving the published route update and based on the subscription data, the published route update to the first compute node that has subscribed to receive route updates for the in-memory database instance associated with the control node.

2. The method of claim 1, wherein receiving the route comprises receiving an Extensible Messaging and Presence Protocol (XMPP) message specifying the route, and wherein the XMPP message is received via an XMPP session between the control node and a virtual router agent of the second compute node.

3. The method of claim 1, wherein receiving the message from the first compute node subscribing to the route updates comprises receiving an XMPP message via an XMPP session between the control node and a virtual router agent of the first compute node.

4. The method of claim 1, wherein receiving the message from the first compute node subscribing to the route updates comprises receiving the message using a message service application programming interface (API).

5. The method of claim 1, further comprising:
detecting, by the control node, that the second compute node is no longer responsive;
deleting, by the control node and in response to the detecting, stored routes learned from the second compute node; and
publishing, by the control node and to the in-memory database service, a route update reflecting deletion of the stored routes learned from the second compute node.

6. The method of claim 1, wherein the SDN controller comprises a plurality of control nodes, the control node being one of the plurality of control nodes, and wherein the in-memory database service comprises a plurality of channels, each channel of the plurality of channels corresponding to a different one of the plurality of control nodes.

7. The method of claim 1, wherein the in-memory database service runs in a separate container distinct from any containers in which the control node runs.

8. A software-defined networking (SDN) controller comprising:
a memory; and
processing circuitry configured to:
receive a message from a first compute node of a plurality of compute nodes, the message subscribing the first compute node to receive route updates for an in-memory database instance associated with a control node of the SDN controller;
update a data structure to store subscription data based on the message from the first compute node;
receive a route from a second compute node of the plurality of compute nodes;
in response to receiving the route, and by the control node using a message service application programming interface (API), publish a route update to the in-memory database instance associated with the control node; and
send, by an in-memory database service in response to receiving the published route update and based on the subscription data, the published route update to the first compute node that has subscribed to receive route updates for the in-memory database instance associated with the control node.

9. The SDN controller of claim 8, wherein the route comprises an Extensible Messaging and Presence Protocol (XMPP) message specifying the route, and wherein the XMPP protocol message is received via an XMPP session between the control node and a virtual router agent of the second compute node.

10. The SDN controller of claim 8, wherein to receive the message from the first compute node subscribing to the route updates, the processing circuitry is further configured to receive an Extensible Messaging and Presence Protocol (XMPP) message via an XMPP session between the control node and a virtual router agent of the first compute node.

11. The SDN controller of claim 10, wherein the XMPP message is processed both by a first virtual machine of a control node container in which the control node runs and by a second virtual machine of an in-memory database service container in which the in-memory database service runs, and wherein the in-memory database service container is distinct from the control node container.

12. The SDN controller of claim 8, wherein to receive the message from the first compute node subscribing to the route updates, the processing circuitry is further configured to receive the message using a message service application programming interface (API).

13. The SDN controller of claim 8, wherein the processing circuitry is further configured to:
detect that the second compute node is no longer responsive;
delete stored routes learned from the second compute node; and
publish, to the in-memory database service, an update reflecting deletion of the stored routes learned from the second compute node.

14. The SDN controller of claim 8, wherein the SDN controller comprises a plurality of control nodes, the control node being one of the plurality of control nodes, and wherein the in-memory database service comprises a plurality of channels, each channel of the plurality of channels corresponding to a different one of the plurality of control nodes.

15. The SDN controller of claim 8, wherein the in-memory database service runs in a separate container distinct from any containers in which the control node runs.

16. The SDN controller of claim 8, wherein the control node comprises one of a virtual machine or a container executing on at least one server of the SDN controller, and wherein the in-memory database service runs in a container executing on the at least one server.

17. A non-transitory computer-readable storage medium comprising instructions for causing one or more programmable processors of a software-defined network (SDN) controller to:
receive, by an in-memory database service of the SDN controller, a message from a first compute node of a plurality of compute nodes, the message subscribing the first compute node to receive route updates for an in-memory database instance associated with a control node of the SDN controller;
store, by the in-memory database service, subscription data based on the message from the first compute node;
receive, by the control node, a route from a second compute node of the plurality of compute nodes;
in response to receiving the route, and by the control node using a message service application programming interface (API), publish a route update to the in-memory database instance associated with the control node; and
send, by the in-memory database service in response to receiving the published route update and based on the subscription data, the published route update to the first compute node that has subscribed to receive route updates for the in-memory database instance associated with the control node.

18. The non-transitory computer-readable storage medium of claim 17, wherein the route comprises an Extensible Messaging and Presence Protocol (XMPP) message specifying the route, and wherein the XMPP message is received via an XMPP session between the control node and a virtual router agent of the second compute node.

19. The non-transitory computer-readable storage medium of claim 17, wherein the instructions cause the one or more programmable processors to receive the message using a message service application programming interface (API).

20. The non-transitory computer-readable storage medium of claim 17, wherein the in-memory database service runs in a separate container distinct from any containers in which the control node runs.

\* \* \* \* \*